INVENTOR
Russell J. Reaney
BY
ATTORNEY

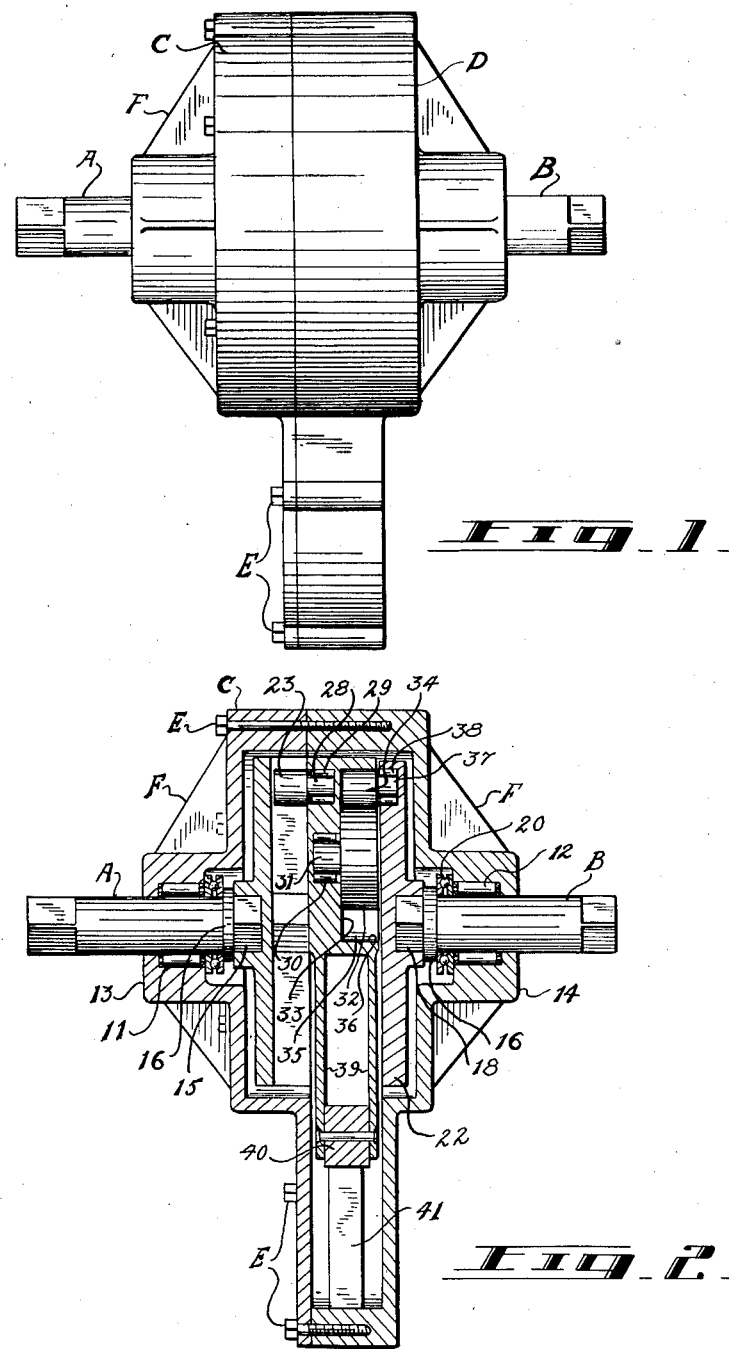
Jan. 23, 1934. R. J. REANEY 1,944,370
GEAR MECHANISM
Filed March 14, 1932  2 Sheets-Sheet 1
INVENTOR
Russell J. Reaney
BY
ATTORNEY Jan. 23, 1934.　　　R. J. REANEY　　　1,944,370
GEAR MECHANISM
Filed March 14, 1932　　2 Sheets-Sheet 2

Patented Jan. 23, 1934

1,944,370

UNITED STATES PATENT OFFICE 1,944,370

GEAR MECHANISM

Russell J. Reaney, Ottawa, Ontario, Canada

Application March 14, 1932. Serial No. 598,612

4 Claims. (Cl. 74—14)

This present invention relates to certain new and useful improvements in gear mechanism and appertains particularly to a device of this kind of the so-called scotch gear type.

A principal object of the invention is to provide a gear connection between a driving and a driven shaft which will give increased speed without loss of power.

Another object of the invention is to provide a gear mechanism connecting a driving and a driven shaft from which may be obtained increased power at the same speed.

A further object of the invention resides in the provision of a gear mechanism connecting a driving and a driven shaft whereby the latter is driven by the former in such a manner as to make it possible to obtain power from the driven shaft at increased speed over the speed of rotation of the driving shaft without loss of power.

A still further object of the invention resides in the provision of a gear mechanism of the character stated connecting a driving and a driven shaft whereby increased driving power may be obtained from the driven shaft at the same speed of rotation as the driving shaft.

A still further object of the invention resides in the provision of a gear mechanism of the character stated which is positive in operation, highly efficient in use and simple and inexpensive in construction and adapted for universal application as a gear mechanism, thus providing a commercially attractive proposition.

To the accomplishment of these and related objects as shall become apparent as the description proceeds, the invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure wherein like characters indicate like parts throughout the several views.

In the drawings:—

Figure 1 is an elevation of the improved gear mechanism;

Figure 2 is a longitudinal vertical section therethrough;

Figures 3, 4, 5:
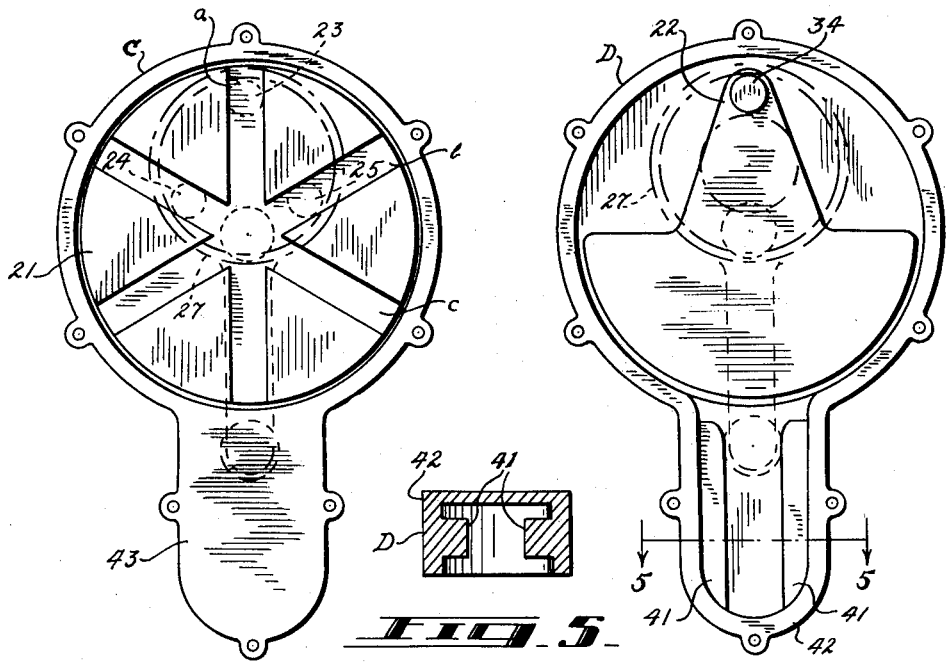
Figure 3 is an elevation, looking at the inner face of the driving shaft housing.
Figure 4 is an elevation, looking at the inner face of the driven shaft housing.
Figure 5 is a detail section, taken substantially on the plane of line 5—5 of Figure 4, looking in the direction indicated by the arrows.
Figures 6, 7, 8:
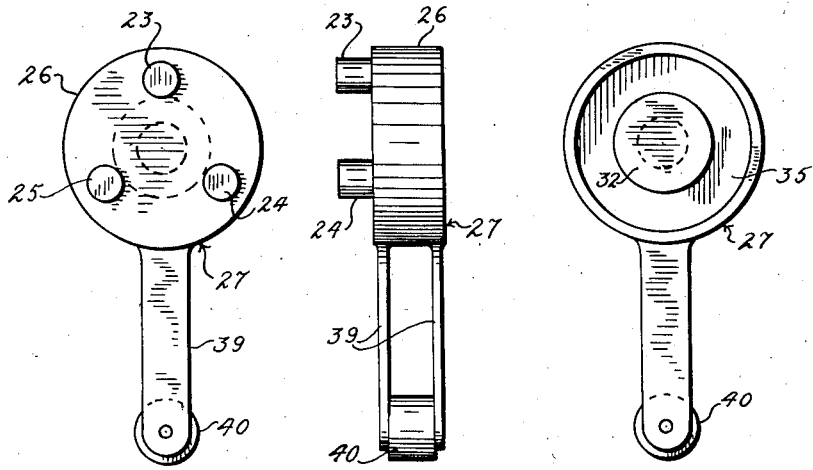
Figure 6 is an elevation of the oscillating member of the gear mechanism, showing one face thereof.
Figure 7 is an elevation at right angles to Figure 6, showing an edge of the oscillating member.
Figure 8 is an elevation at right angles to Figure 7, showing the second face of the oscillating member opposite to the face shown in Figure 6.

Referring more in detail to the drawings, it is to be noted that the driving shaft A and the driven shaft B are in spaced alignment and respectively rotate in opposed housings C and D, detachably connected by screw bolts E or other appropriate means. These housings C and D have base plates F by means of which they may be readily held stationary by attaching the housings C and D to a stationary support.

To reduce friction to the minimum, roller bearings 11 and 12 are provided around the driving shaft A and the driven shaft B, respectively, within the outwardly projecting stems 13 and 14 of the respective housings C and D.

The inner end 15 of the driving shaft A is squared and an annular collar 16 is provided on the driving shaft A adjacent said squared inner end 15. Thrust bearings 17 are provided on the driving shaft A between the annular collar 16 and the inner end wall of the stem 13 of the housing C, to further reduce friction to the minimum. Similarly, the inner end 18 of the driven shaft B is squared and an annular collar 19 is provided on the shaft B adjacent said square inner end 18. Thrust bearings 20 are provided on the driven shaft B between the annular collar 19 and the inner end wall of the stem 14 of the housing D to reduce to the minimum friction during rotation of the driven shaft B.

The special driving connections between the squared inner ends 15 and 18 of the driving shaft A and driven shaft B are all enclosed in and protected by the housings C and D and include the scotch gear wheel or disc 21 which is mounted concentrically on the squared inner end 15 of the driving shaft A and an opposed wheel or disc 22 which is likewise mounted concentrically on the squared inner end 18 of the driven shaft B. These wheels or discs 21 and 22 are spaced from one another. In the face of the wheel or disc 21, three equally spaced slots $a$, $b$, $c$, are provided, intersecting one another intermediate their ends and at the centre of the wheel or disc 21.

Operating in the slots $a$, $b$, $c$, of the wheel or disc 21 are the enlarged heads of the roller studs 23, 24 and 25 arranged eccentrically on the opposed face of the circular head 26 of the oscillating gear member 27 and projecting therefrom. These roller studs 23, 24 and 25 are equally spaced from one another and located near the peripheral edge of the head 26 with the roller stud 23 adjacent the upper side of said head 26. All of the roller studs 23, 24 and 25 have reduced stems 28 rotatable in the head 26 with anti-friction rollers 29 arranged in said head 26 around each of the stems 28. Rotatable in roller bearings 30 in the centre of the head 26 is the reduced stem 31 of the guide roller stud 32 which is of a considerable greater diameter than the heads of the studs 23, 24 and 25 and occupies the centre of the pocket 33 in this side of the head 26 of the oscillating member 27 provided by hollowing out the head 26 in the form of a cup. The guide roller stud 32 serves to prevent backlash of the roller stud 34, the head of which operates in the annular channel 35 formed in the pocket 33 around the guide roller stud 32, the roller stud 34 operating between the periphery of the guide roller stud 32 and the outer annular wall 36 of the pocket 33. The reduced stem 37 of the roller stud 34 rotates freely in the roller bearings 38 provided around the same and within the wheel or disc 22 on the squared inner end 18 of the driven shaft B. It is also to be noted that the reduced stem 37 of the roller stud 34 is positioned eccentrically in the wheel or disc 22 and near the upper side thereof, thus positioning the roller stud 34 directly opposite or in alignment with the roller stud 23. It is also to be noted that the wheel or disc 22 is of irregular or segmental form with opposite upper corner sections cut away, leaving an upstanding portion 22' in which the reduced stem 37 of the roller stud 34 is supported. To prevent rotation of the oscillating member 27, the latter has a pair of depending forward and rear legs 39 rigid with the head 26 of the member 27 and forming a depending stem directed downwardly from the lower side of the head 26. A roller 40 is carried in the lower ends of the legs 39 and rides on the pair of opposed upstanding guide ribs 41 provided on the inner face of the opposite sides of the depending extension 42 of the housing D and against the front face of which fits the depending plate 43 of the housing C. The opposite legs 39 operate in the depending portion 42 of the housing D, on opposite sides of the ribs 41, thus permitting the head 26 of the oscillating member 27 to move in a circle in the housing D as the roller 40 moves upwardly and downwardly on the ribs 41 and the legs 39 of the oscillating member 27 oscillate in the main portion of the housing D and the depending extension 42 thereof.

As the construction of the device has thus been described in detail, brief reference is now had to its use and modus operandi: The oscillating member 27 is shown in its uppermost position with the roller stud 23 at the upper end of the slot, $a$, and the studs 24 and 25 in the upper portions of the slots $b$ and $c$, respectively, of the trammel gear wheel or disc 21 and near the centre of said wheel or disc 21. As power is applied to the driving shaft A and the same thereby rotated, the roller studs 23, 24 and 25 operate in the slots $a$, $b$ and $c$ in a manner which will be readily understood by those familiar with trammel gear mechanisms of the scotch gear type, thereby causing the head 26 of the oscillating member 27 to describe a complete circle in its movement in the housing D with the depending stem of the oscillating member 27 oscillating in the main portion of the housing B and the depending extension 42 thereof, without permitting the head 26 of the oscillating member 27 to revolve or rotate. This results in driving of the wheel or disc 22 and the driven shaft B at approximately double the speed of rotation of the driving shaft A, due to travelling of the roller stud 34 in the channel 35 in the opposite side of the head 26 of the oscillating member 27, with the roller stud 34 at all times opposite or in alignment with the roller stud 23, and without loss of power. With this gear mechanism, increased power may be obtained from the driven shaft B at the same speed of rotation as the driving shaft A, by employment of gears or pulleys of proper diameter on the driving shaft A and the driven shaft B. It is also apparent that the power obtained from the driven shaft B or the speed may be varied with respect to the power or speed of the driving shaft A, as desired, by varying the gears or pulleys on the drive shaft A and the driven shaft B.

From the foregoing description taken in connection with the accompanying drawings, it will be manifest that a gear mechanism is provided that will fulfill all the necessary requirements of such a device but as many changes could be made in the above description and many apparently widely different embodiments of the invention may be constructed within the scope of the appended claims without departing from the spirit or scope thereof, it is intended that all matters contained in the said accompanying specification and drawings, shall be interpreted as illustrative and not in a limitative or restrictive sense.

Having thus described the invention, what is claimed is:—

1. A gear mechanism including a driving shaft; a driven shaft in spaced alignment therewith; a housing for the opposed ends of said shafts serving as bearings therefor; a trammel gear drive mechanism including an oscillating member within said housing providing a drive connection between the opposed ends of said shafts; means within said housing to guide said oscillating member and prevent rotation thereof; and friction reducing roller bearing mountings within said housing for the operative parts of said trammel gear drive connection.

2. A gear mechanism including a driving shaft; a driven shaft in spaced alignment with said driving shaft; a stationary housing enclosing and supporting the opposed ends of said shafts; roller bearing and thrust bearing mountings for said opposed ends of the shafts in said housing; a trammel gear drive mechanism including an oscillating member within said housing providing a drive connection between the opposed ends of said shafts driving the driven shaft at increased speed over the speed of the driving shaft without loss of power; means within said casing to guide said oscillating member and prevent rotation thereof; and anti-friction roller bearings for the operative parts of said trammel gear drive mechanism.

3. A gear mechanism including a driving shaft; a driven shaft in spaced alignment with said driving shaft; a stationary housing enclosing and supporting the opposed ends of said shafts; a scotch gear wheel disc mounted concentrically on the inner end of said driving shaft; a disc mounted concentrically on the inner end of said driven shaft spaced from the confronting face of said scotch gear wheel; a roller stud projecting inwardly from said mentioned second disc toward said scotch gear wheel; an oscillating gear member between said scotch gear wheel disc and said second mentioned disc; studs on one side of said oscillating gear member for engagement with said scotch gear wheel disc; and an annular channel cut eccentrically in the opposite lateral face of said oscillating gear member for the reception of said second mentioned disc carried roller stud; and means to guide said oscillating member and prevent the rotation thereof.

4. A gear mechanism including a driving shaft; a driven shaft in spaced alignment with said driving shaft; a stationary two-part housing supporting said shafts; an extension depending from said housing; a pair of guide ribs on the opposite inner faces of said depending extension; a trammel gear drive connected between the opposed ends of said shafts within said housing to drive said driven shaft at an increased speed over the speed of rotation of said driving shaft without material loss of power, comprising a scotch gear on said driving shaft; a disc on said driven shaft and an oscillating gear member between said scotch gear and said disc; a pair of legs depending from said oscillating gear member and a roller carried between the lower ends of said legs adapted to ride on the guide ribs in the depending portion of said stationary housing.

RUSSELL J. REANEY.